United States Patent [19]

Yamakita et al.

[11] Patent Number: 5,414,416
[45] Date of Patent: May 9, 1995

[54] TEMPERATURE DEPENDENT CONTROL MODULE CLUSTER UNIT FOR MOTOR VEHICLE

[75] Inventors: Hiroshi Yamakita, Kariya; Katsuhiro Ina, Okazaki; Kazuhiro Higuchi; Akira Uchida, both of Kariya; Katsuhisa Tsuji, Kozakai, all of Japan

[73] Assignee: Nippondenso Co., Ltd., Kariya, Japan

[21] Appl. No.: 50,112

[22] PCT Filed: Sep. 2, 1992

[86] PCT No.: PCT/JP92/01122
§ 371 Date: Apr. 28, 1993
§ 102(e) Date: Apr. 28, 1993

[87] PCT Pub. No.: WO93/04896
PCT Pub. Date: Mar. 18, 1993

[30] Foreign Application Priority Data
Sep. 3, 1901 [JP] Japan .................. 3-223086

[51] Int. Cl.⁶ .................. H04Q 9/00; B60R 16/02
[52] U.S. Cl. .................. 340/825; 361/103
[58] Field of Search ............ 340/584, 870.17, 825.06;
307/91, 104; 361/103, 694, 696, 730, 731, 814,
816, 818; 395/750; 364/557

[56] References Cited

U.S. PATENT DOCUMENTS 4,631,641 12/1986 Brombal et al. .................. 361/818
4,821,145 4/1989 Corfitts et al. .................. 361/816
4,967,311 10/1990 Ferchau et al. .................. 361/818
5,010,322 4/1991 Fry et al. .................. 361/818
5,119,497 6/1992 Freige et al. .................. 395/750

FOREIGN PATENT DOCUMENTS 50-153630 12/1975 Japan .
62-198544 9/1987 Japan .
62-237895 10/1987 Japan .
64-87822 3/1989 Japan .

*Primary Examiner*—Michael Horabik
*Attorney, Agent, or Firm*—Cushman, Darby & Cushman

[57] ABSTRACT

A control module cluster unit which enables high-speed communication by restraining the effect of noise, for constituting a high-reliability vehicle control system including a plurality of control modules each having control functions modularized in accordance with control objects, such as ECU for engine control, ECU for ABS, etc. in conventional use, an input/output module, common modules, and communication modules collectively mounted in one casing are so constituted as to enable mutual communication through a common bus on a mother board. A signal inputted in the input/output module is distributed to each module requiring the input signal through the mother board. The control module cluster unit also has a temperature sensor for detecting casing temperature and a power source for powering each of the modules. When detected temperature is abnormally high, the power source shuts down less important parts of the control module cluster units.

5 Claims, 6 Drawing Sheets

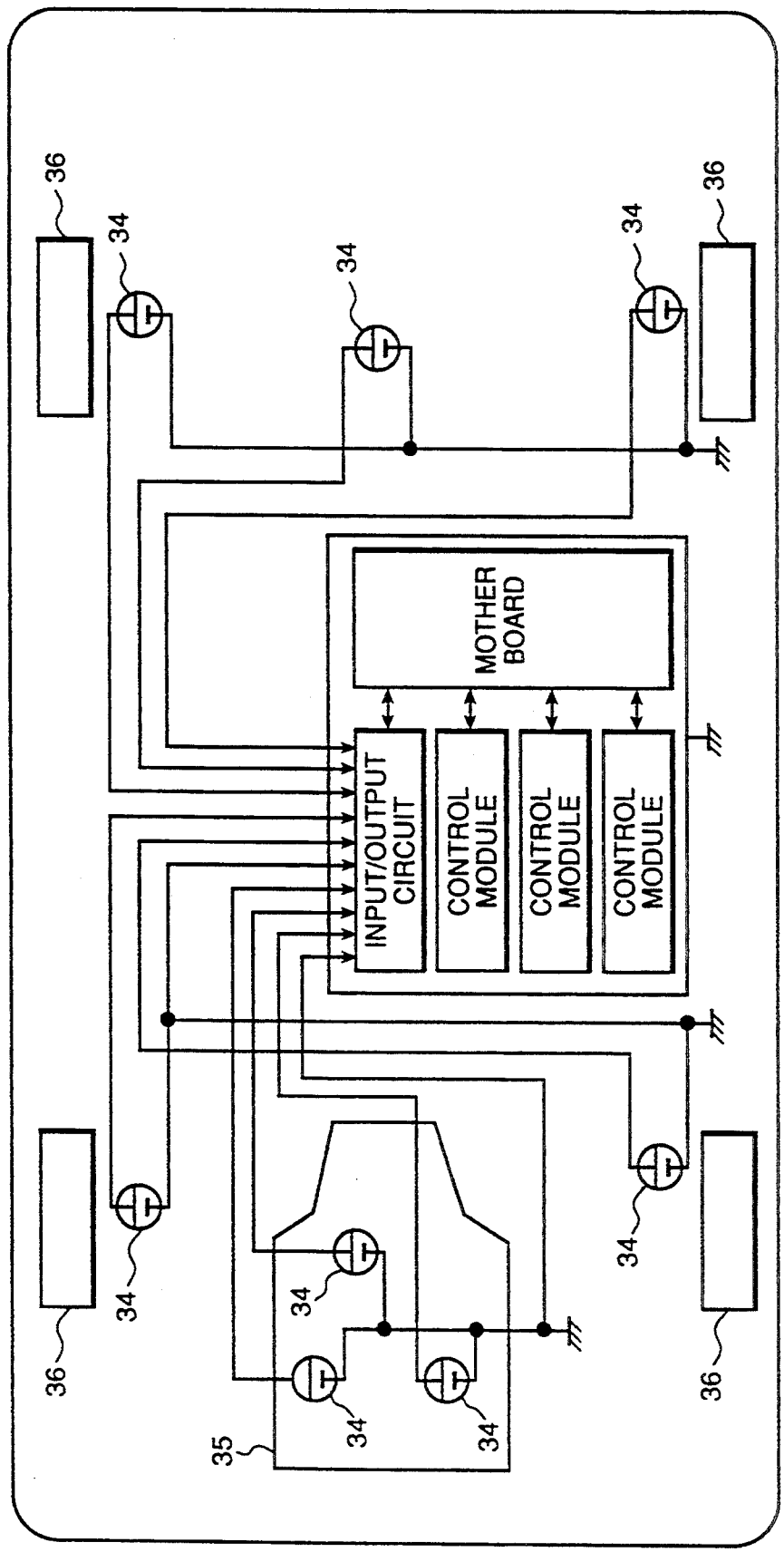

5,414,416

TEMPERATURE DEPENDENT CONTROL MODULE CLUSTER UNIT FOR MOTOR VEHICLE

TECHNICAL FIELD

The present invention pertains to a control module cluster unit for motor vehicles, which is a modularized electronic control device formerly separately present; a plurality of such control modules are used as a cluster collectively mounted in one casing.

BACKGROUND ART

On a motor vehicle a plurality of electronic control units (hereinafter termed the ECU's) are mounted by each object and function of control. As a means for exchanging information between the ECU's, a serial data communication device has been known (for example, a device disclosed in Japanese Patent Laid-Open No. Sho 62-237895).

The ECU's are interconnected by a serial data link, so that each ECU will be able to utilize data inputted by other ECU, thereby dispensing with duplex wirings between each ECU and each sensor in order to decrease the number of wirings.

However, since the ECU's are connected by wiring harness, there will occur such a disadvantage that if information are exchanged at a high speed between the ECU's, there arises a radiated noise which will affect a car radio, TV, etc. It is, therefore, difficult to reduce noise without decreasing the communication speed. Besides, there is a problem of an effect of external noise, the prevention of which will be required.

To perform serial data communication between the ECU's, a power source circuit and an input/output circuit are required between the ECU's, which, therefore, will be demanded to be decreased in overall weight and size because of a limited mounting space.

In view of the above-described problem, the present invention has been accomplished and has as its object to provide a control module cluster unit capable of constituting a highly reliable vehicle control system for motor vehicles which is capable of high-speed data communication between the ECU's while restraining the effect of noise.

DISCLOSURE OF INVENTION

According to the present invention, the control module cluster unit comprises, as shown in FIG. (1A), a plurality of control modules including modularized control functions for controlling a plurality of equipment mounted on a motor vehicle; a mother board connecting these control modules with each other in such a manner that communication among them can be effected; and an input/output module connected with the mother board, for performing the input of data to, and output of data from, each equipment to be controlled; all of the plurality of control modules, mother board, and input/output modules are housed in one casing.

Furthermore, in the present invention are provided a plurality of control module cluster units claimed in claim 1 described above; these cluster units are distributed in desired locations corresponding to the locations of the equipment to be controlled; and the cluster units are connected by means of a high-speed communication means; that is, there are adopted control module cluster units of distributed arrangement for motor vehicle.

Furthermore, in the present invention the control module cluster unit described above has a fail-safe mechanism for preventing a temperature rise in the interior of the casing which includes, as shown in FIG. 1 (B), a temperature detecting means for detecting a casing interior temperature, and a function stop control means for stopping a less important function of the unit when the casing interior temperature detected is above a specific value.

In the present invention of the above constitution, when one signal is inputted into a plurality of control modules, the signal thus inputted into the input/output module can be distributed to each control module through the mother board, thereby enabling preventing the duplicate use of the input/output circuit. Furthermore, because a plurality of control modules are present within one casing, it is possible to collectively assemble such commonly usable circuits as control modules of the power source circuit and other circuits for holding results of learning in one casing. Furthermore, exchange of information between the control modules is done through the mother board, that is, communication is done within the same casing, thereby reducing radiated noise. The unit, therefore, is hardly affected by external noises.

Furthermore, in the present invention, for example the unit for controlling equipment arranged in the front part of a motor vehicle can be distributed in the front part of the motor vehicle, while the unit for controlling equipment located in the rear part of the motor vehicle also can be distributed in the rear part of the motor vehicle. These front and rear units, if collected at one place, will become too large to mount, but, when miniaturized, can be distributed to optimum locations in accordance with mounting spaces in the motor vehicle.

Furthermore, in the present invention, when the casing interior temperature detected by the temperature detecting means exceeds the specific value, a less important function of the unit will be stopped to thereby enable preventing a temperature rise within the casing, for example stopping a less important driving unit and stopping power supply to a less important control module itself. Accordingly, it is possible for example to insure normal operation of the minimum function necessary for driving the motor vehicle. The control module may be provided with a part or all of the function of this function stop control means. For better understanding of the present invention as well as other objects and further features thereof reference is had to the following drawings and description.

BRIEF DESCRIPTION OF DRAWINGS

FIG. 8 is a schematic explanatory view for explaining the schematic constitution of wirings of sensors and control equipment of one embodiment according to the present invention.

BEST MODE FOR CARRYING OUT THE INVENTION

Hereinafter embodiments of a control module cluster unit according to the present invention will be explained with reference to the accompanying drawings.

Figure 1A:
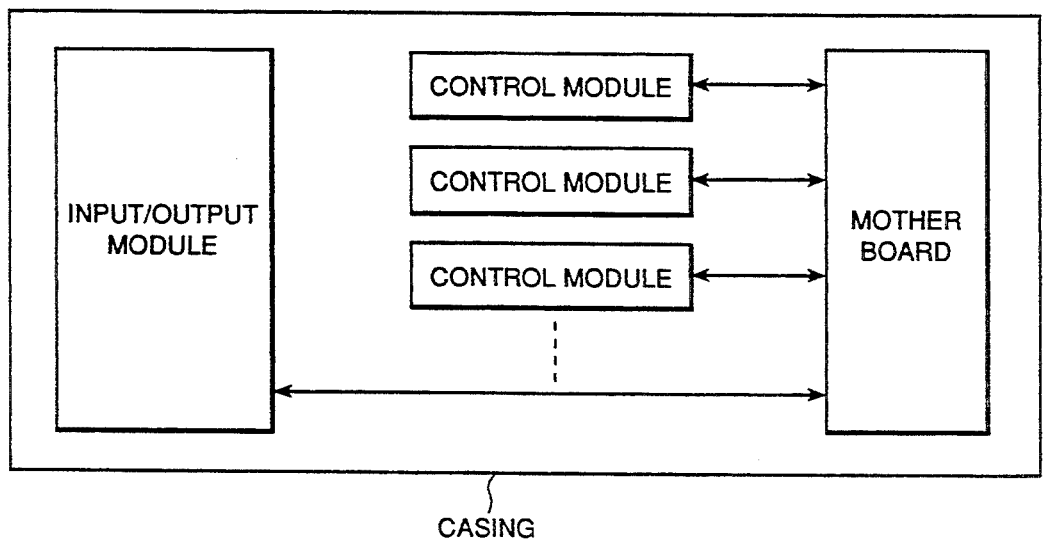
FIGS. 1A and 1B are schematic drawings showing one embodiment of the present invention.
Figure 1B:
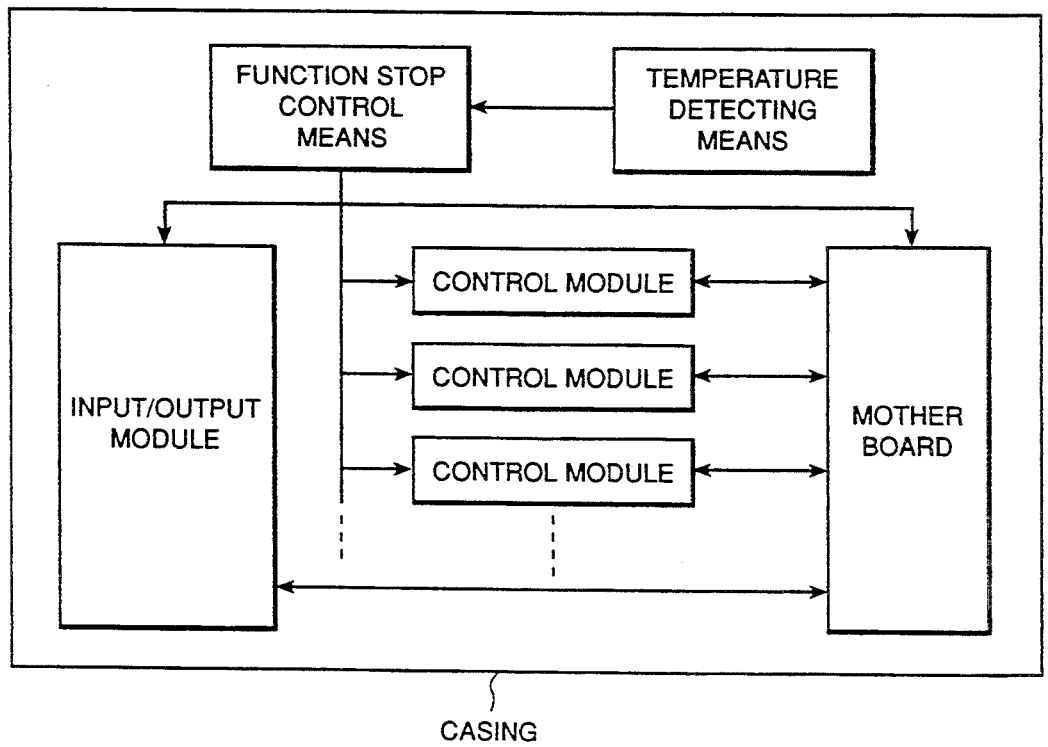
Figure 2:
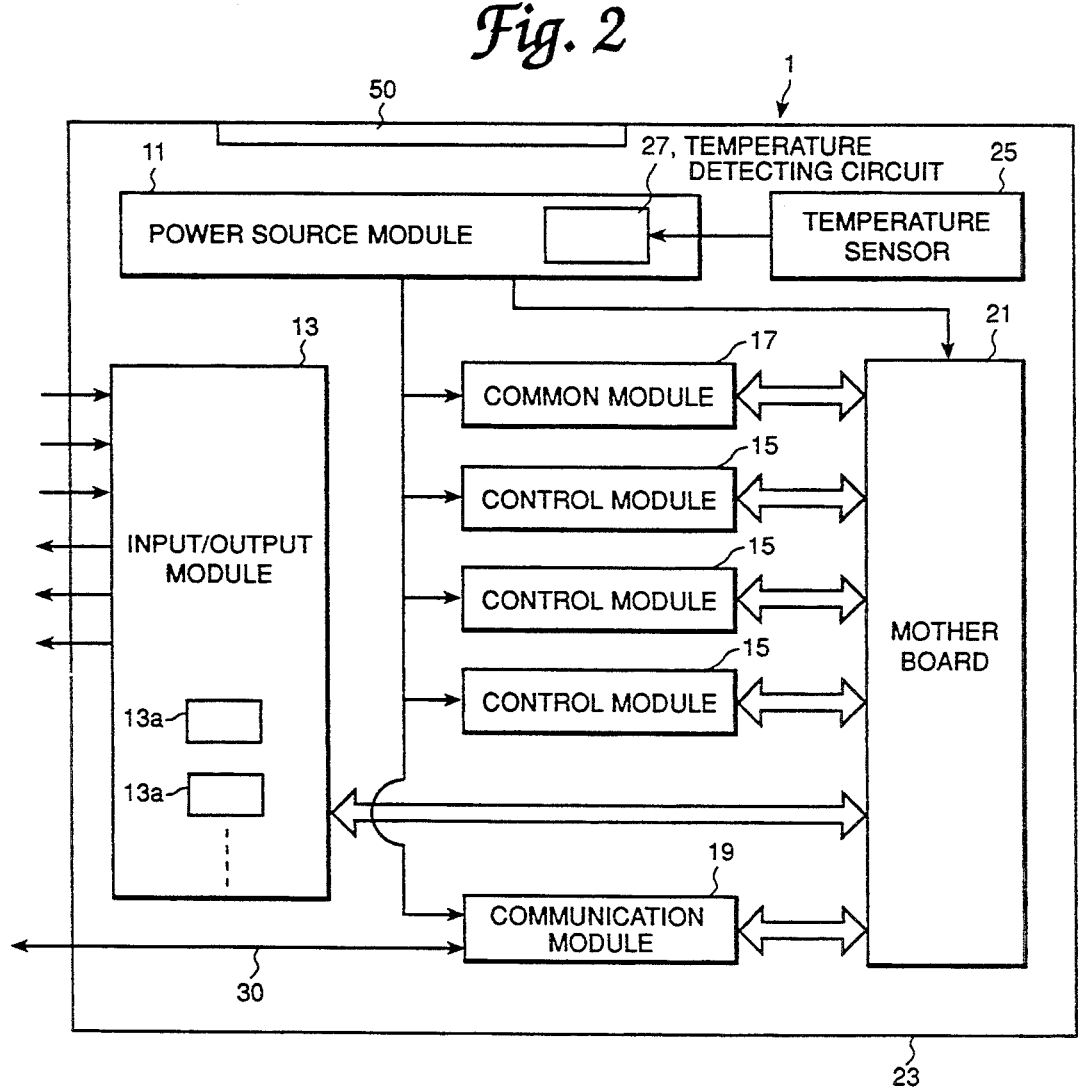
FIG. 2 is a block diagram showing the schematic constitution of one embodiment of a control module cluster unit for motor vehicle according to the present invention.

FIG. 2 is a block diagram showing the schematic constitution of one embodiment of the control module cluster unit for motor vehicle according to the present invention. In FIG. 2, the unit 1 has a power source module 11, an input/output module 13, a plurality of control modules 15, a common module 17, a communication module 19, and a mother board 21.

The power supplied to the unit 1 comes all from the power source module 11, from which substantial electric power is supplied to the input/output module 13, each control module 15, the common module 17, the communication module 19 and the mother board 21.

The input/output module 13 is connected by a wiring harness to such external devices and equipment as sensors and actuator (both of which are not illustrated) provided for each control object, to enable inputting a detection signal from the sensors. Also, there is a driving circuit 13a for each actuator inside; this driving circuit 13a is designed to output a driving signal to each actuator in accordance with an actuator driving control signal described later on.

Each of the control modules 15 is a device of modularized control function for the control of an ECU for engine control and an ECU for an antilock braking system (hereinafter termed the ABS).

Functions equivalent to memories for storing results of learning are collected to the common module 17 provided in each ECU in prior art. The communication module 19 is adopted when used as a distributed-type control module cluster unit for motor vehicle described later; for example when the unit 1 is used independently, this communication module may be dispensed with.

The input/output module 13, each control module 15, common module 17, and communication module 19 are so constituted as to be able to make intercommunication through a common bus on the mother board 21. Furthermore the modules 11, 13, 15, 17 and 19 and the mother board 21 described above are collectively mounted inside the same casing 23.

Also installed in the casing is a temperature sensor 25 for detecting casing temperature, which is connected to a temperature detecting circuit 27 in the power source module 11.

Next, the operation of the unit 1 will be explained.

A signal from each of the sensors and switches is inputted to the input/output module 13 by means of one wiring harness. In this input/output module 13 the signal is subjected to buffering, then being distributed through the mother board 21 to each of the modules 15, 17 and 19 requiring an input signal.

Each control module 15 receives an input signal, carries out operation corresponding to each control function, and produces an actuator driving control signal, which will be outputted to the input/output module 13 via the mother board 21. Then, a related driving circuit 13a in the input/output module 13 outputs a driving signal to a corresponding actuator in accordance with an actuator driving control signal, thus driving the actuator by this driving signal.

According to the present embodiment, a single harness suffices for connection of the sensors or the actuator with the input/output module 13 as described above. Therefore the number of the wiring harnesses can be decreased. Furthermore, when one signal is to be inputted into a plurality of control modules 15, the signal that has been inputted to the input/output module 13 can be distributed to each control module 15 via the mother board 21, preventing the duplication of a circuit for input and output.

In the meantime, communication among the modules 13, 15, 17 and 19 in the unit 1 is effected through the mother board 21 in the casing 23, and therefore can be increased in speed without occurrence of much radiated noise, and will be little affected with external noise, thereby allowing high-speed communication.

Figure 6:
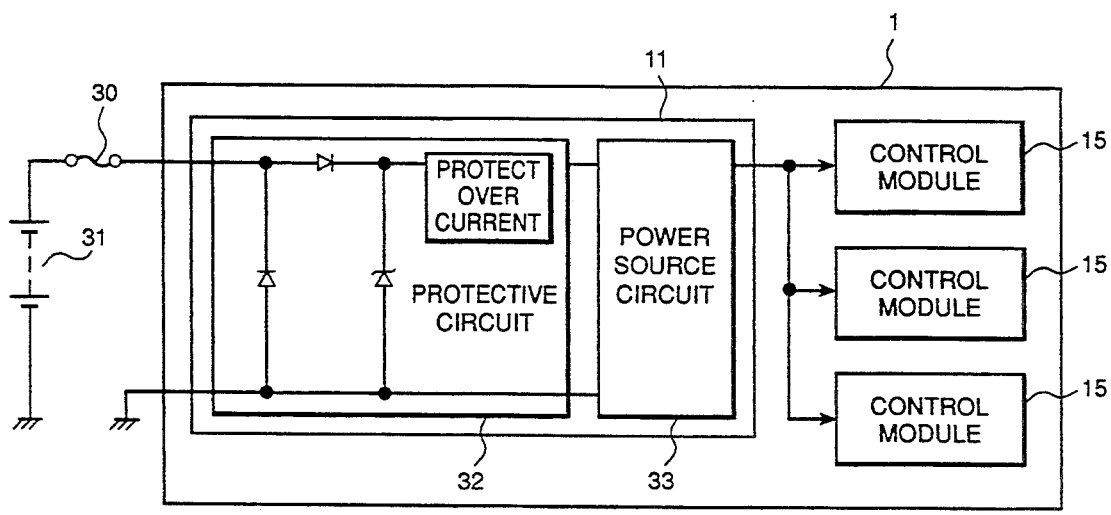
FIG. 6 is a schematic explanatory view for explaining the schematic constitution of the power source module in the present embodiment.

Furthermore, if a plurality of control modules 15 are assembled in one unit, only one power source module 11 is sufficient, and therefore it is possible to prevent the use of duplicate power source circuits. Furthermore, a protective circuit 32 such as a surge protective circuit peculiar to control equipment mounted on the vehicle can be collectively mounted by use of a power source module as shown in FIG. 6, by making common this power source module 11; therefore it is possible to concentrate the circuit without necessity for preparing such a protective circuit 32 at each module. In FIG. 6, the reference numeral 30 refers to a fuse; 31 denotes a battery mounted on the vehicle; and 33 represents a power source circuit.

Furthermore, it is possible to collectively store the result of learning as to control at each control module 15 in the common module 17. Therefore the result of learning can be held to reduce power consumption by supplying what is called the dark current only to the common module 17 without supplying the dark current to each control module 15.

The modules 11, 13, 15, 17 and 19, classified by each function, can easily be added or removed in accordance with a function required, correspondingly to a vehicle model.

Figure 7:
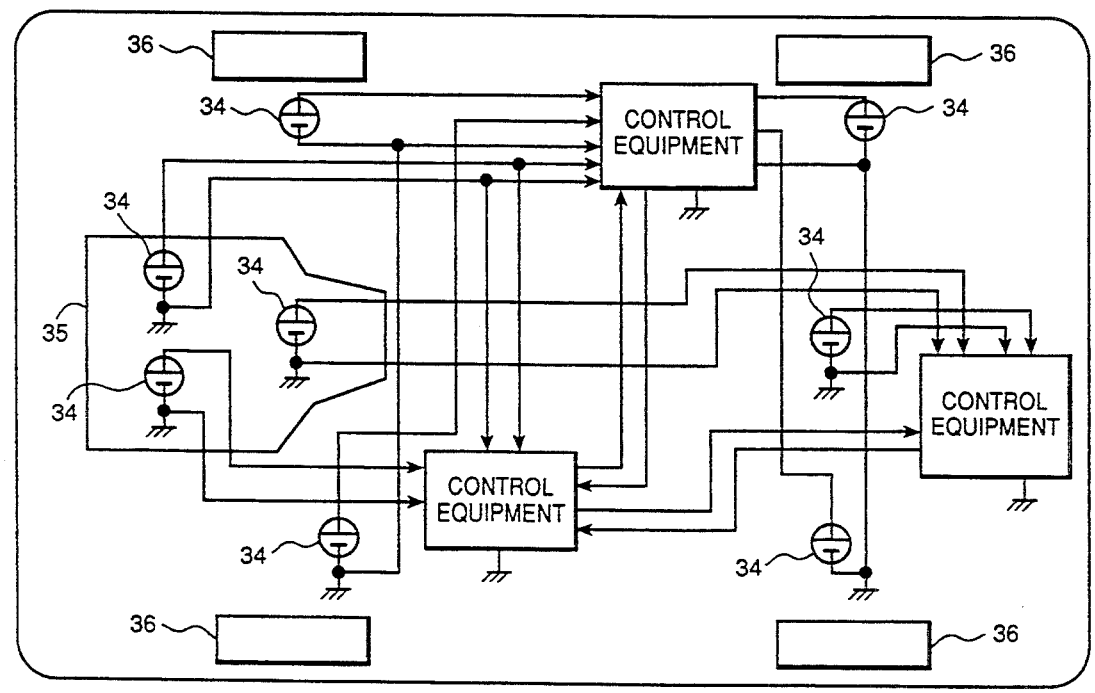
FIG. 7 is a schematic explanatory view for explaining the schematic constitution of wirings of prior-art sensors and control equipment.

Thus adopting the above-described constitution and operating the modules can solve problems inherent to control equipment mounted on a motor vehicle described below. That is, particularly in the control equipment mounted on a motor vehicle, the GND potential often differs with a mounting place on the vehicle. For example, as shown in FIG. 7, an engine 35 and a luggage compartment are different in distance from a battery, and therefore the GND potential varies between the engine 35 and the luggage compartment.

A sensor 34 used in each control equipment is mounted in many places of the vehicle (for example in the vicinity of wheels 36); the GND sensor used as a reference of these sensors 34 differs with the location of these sensors 34.

Each of these control equipment, therefore, has the following problem that when a signal is inputted from the sensor 34 of different GND potential and from other control equipment, it becomes necessary to take a measure to input the signal through two lines including a signal line of the sensor 34 (or the control equipment) and the line of the GND potential of the sensor 34 (or the control equipment); and accordingly installation of excess wiring harnesses, in the motor vehicle, which are not used for information transmission is demanded.

According to the above-described embodiment, the vehicle control equipment are centralized in the unit to enable common use of the GND potential of each control module; therefore, as shown in FIG. 8, a signal to be commonly used at each control device can be inputted to the input/output circuit only by means of the signal line for information transmission, with the wiring harness from each sensor 34 for the GND potential disused. Also communication between the control modules, being effected via the mother board, can be performed without requiring the wiring harness.

Figure 3:
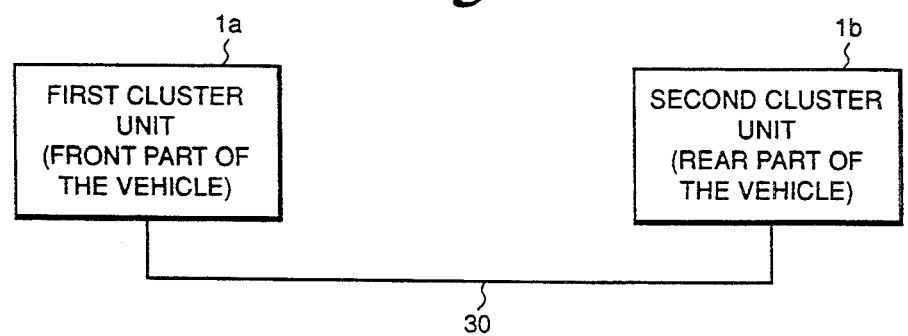
FIG. 3 is a schematic explanatory view of another embodiment of a distributed-type control module cluster unit for motor vehicle according to the present invention.

Next, another embodiment of a distributed-type control module cluster unit for motor vehicle will be explained. As shown in FIG. 3, functions of the ECU formerly distributed to the whole part of the motor vehicle are scatteringly mounted in two cluster units 1a and 1b having the similar constitution as the cluster unit 1 of the first embodiment.

Figure 4:
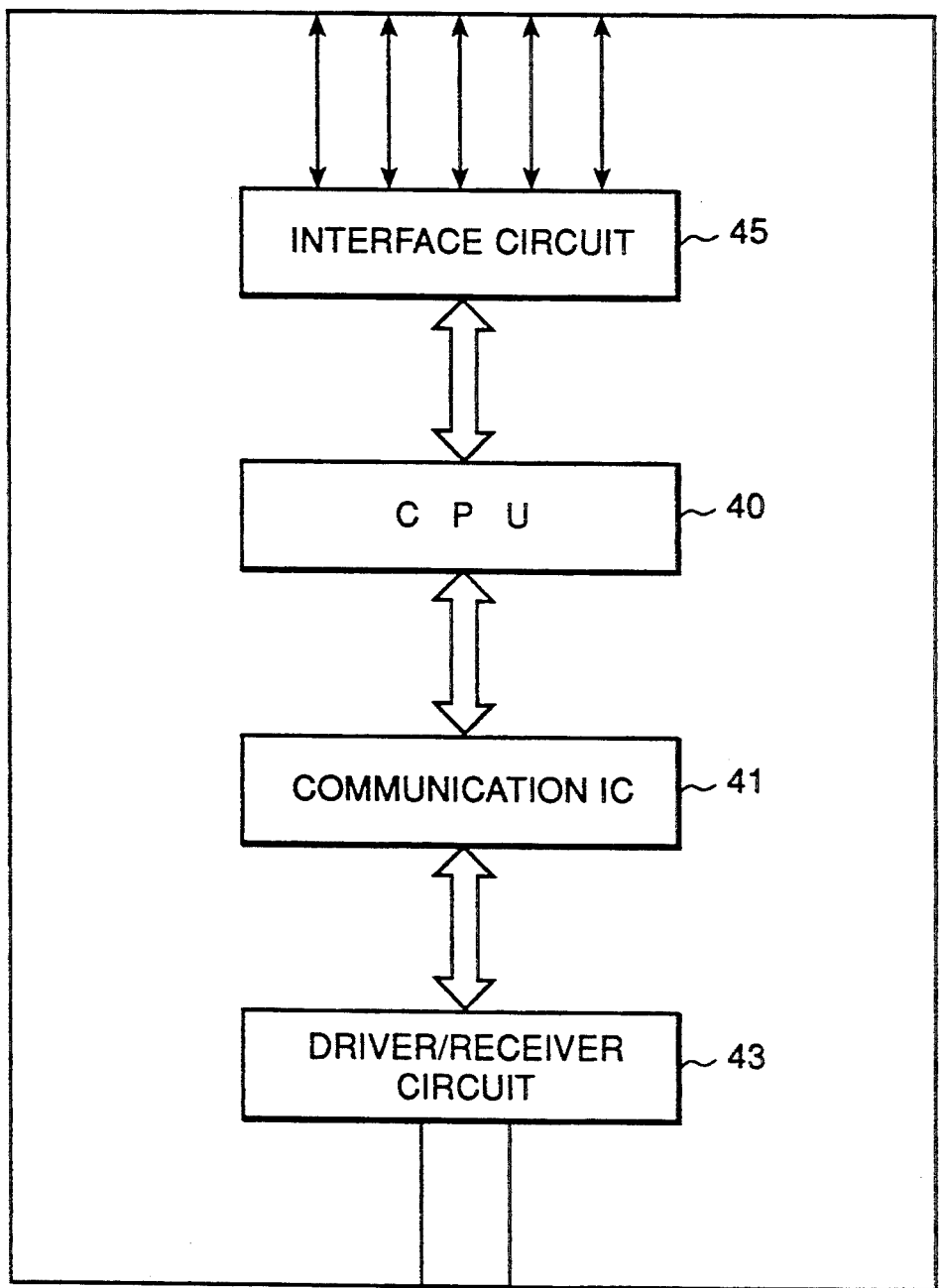
FIG. 4 is a block diagram showing the schematic constitution of a communication module of the present embodiment.

The communication modules 19 of the first and second cluster units 1a and 1b are connected with each other by an optical fiber 30 as a means for high-speed communication. Hereinafter an example of constitution of these communication modules 19 will be explained by referring to FIG. 4.

The communication module 19 is provided with a known CPU 40, a communication IC 41, a driver/receiver circuit 43, and an interface circuit 45, and constituted such that an information which has been entered into the driver/receiver circuit 43 through the optical fiber 30 will be inputted into a communication IC 41 known as an IC of a LAN (Local Area Network) for automobiles specified for example in SAE (Society of Automotive Engineers) JI850 and CAN (Control Area Network).

The information that has entered the CPU 40 from the communication IC 41 will be outputted to the mother board 21 through the interface circuit 45.

In the case of the communication module 19 in the first cluster unit 1a, the CPU 40 judges the modules 13, 15 and 17 which need information that have been inputted in the first cluster unit 1a, then transferring the information to the modules 13, 15 and 17 via the mother board 21. Also, the information that have been transferred to the modules 13, 15 and 17 may be taken in, when needed, by each of the modules 13, 15 and 17.

Furthermore, the information, when needed by the second cluster unit 1b, can be transmitted reversely from the first unit 1a through the same channel. That is, information can be exchanged between the first and second cluster units 1a and 1b.

For this purpose, the first cluster unit 1a is located in the front part of the vehicle, while the second cluster unit 1b is disposed in the rear part of the vehicle. And the wiring is so arranged that, with the function of the ABS divided, a sensor signal, an actuator driving signal or a brake signal pertaining to the front wheels may be fed to the first cluster unit 1a; in the meanwhile these signals pertaining to the rear wheels may be fed to the second cluster unit 1b.

Provided that a control operation function concerning the ABS is had by the control module 15 in the second assembly 1b. In this case, the control module 15 in the second cluster unit 1b performs calculation on the basis of data concerning the front wheels that has been inputted from the first cluster unit 1a through the optical fiber 30 and data from the sensor which is in direct connection with the second cluster unit 1b. And through the similar channel, control information on the front and rear wheels are transferred. The units 1a and 1b, therefore, can be made smaller than those built in one unit, by enabling information exchange between these plural units 1a and 1b through their respective communication modules 19, and can be disposed in optimum places in accordance with mounting spaces in the vehicle, where a large unit collectively including both of these units is too large to mount.

Control functions, for example a function to control the engine mounted in the front part of a motor vehicle and a function of the ABS for the front wheels described above, require a short wiring when mounted in the front part of the vehicle. These control functions are assembled in the first cluster unit 1a and mounted in the front part of the vehicle. In the meantime, the control function, which requires a short wiring when mounted in the rear part of the vehicle, is incorporated in the second cluster unit 1b and mounted in the rear part of the vehicle.

It is possible to reduce the length of wirings by thus disposing the control units as compared with wirings installed between one place and each sensor and actuator, thereby realizing a decreased wiring space and weight.

Figure 5:
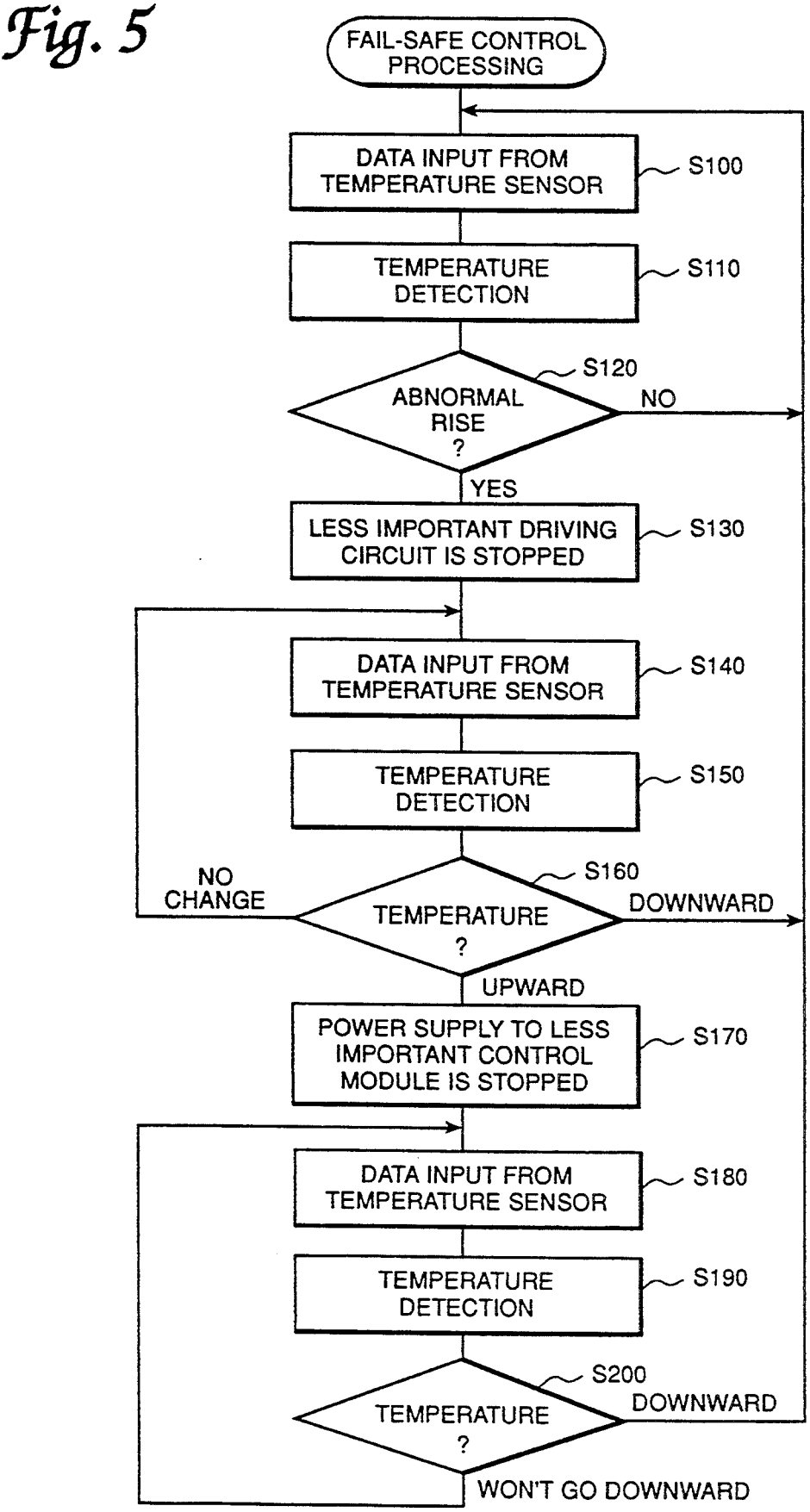
FIG. 5 is a flowchart showing fail-safe control processing in the present embodiment.

Next, the fail-safe mechanism of the control module cluster unit for motor vehicle will be explained. As described in the embodiment, heat generated at the power source module 11, or heat generated at the driving circuit 13a, become easy to concentrate. At this time, a fan 50 is operated to circulate the air inside and outside of the casing 23 for purpose of heat dissipation. However, should the fan 50 stop due to a trouble, or should the unit temperature rise excessively high albeit the fan 50 is operating, each control module 15 would operate abnormally, resulting in unfeasibility of normal control. The fail-safe control processing for preventing such an abnormal condition will be explained by referring to the flowchart in FIG. 5. This processing, in the present embodiment, is executed at the power source module 11 and the control module 15.

First, the power source module 11 inputs temperature data from the temperature sensor 25 (Step S100), and detects temperature in the casing 23 (Step S110), thus judging whether or not the temperature has increased abnormally high (Step S120). This judgment of the abnormal temperature rise can be made by judging for example whether or not the temperature rise within a fixed period of time is above a specific value.

When no abnormal temperature rise is seen, the processing at Steps S100 and S110 is repeated. In case of abnormal rise (Step S120), an abnormal temperature signal is sent to each control module 15. The control module 15 sends a stop signal to the input/output module 13 in order to stop the power system driving circuit for performing other than important controls (fuel injection control, ignition control, brake control, etc.).

Then, the power source module 11 inputs temperature data from the temperature sensor 25 (Step S 140) and detects temperature in the casing 23 (Step S150), to judge a temperature change (Step S160). When no temperature change has taken place, the procedure goes back to Step S140, inputting the temperature data again to detect the temperature and to judge a temperature change.

In case of a temperature drop, the procedure goes back to Step S100, where the following procedure will be repeated. In the meantime, if the temperature rises further although the driving circuit has been stopped, the power source module 11 will stop supplying the power to a less important part of the control modules 15 (Step S170). The term "less important" stated above is meant by the control module 15 concerning other than the above-mentioned important control.

The power source module 11 inputs the temperature data again (Step S180), detects temperature in the casing 23 (Step S190), and judges a temperature change (Step S200); when the temperature will not lower, the procedure goes back to Step S180, where the temperature drop will be inputted again to detect the temperature for purpose of checking a temperature change. In case of a temperature drop, the procedure goes back to Step S100 to repeat the following processing.

The temperature sensor 25, temperature detecting circuit 27, and execution of processing at Steps S100, S110, S140, S150, S180 and S190 work as temperature detecting means; and execution of processing at Steps S120, S130, S160 and S170 will work as a function stop control means.

As described above, in the event that the temperature in the casing 23 of the units 1, 1a and 1b has risen abnormally high, first a less important driving circuit 13a will be stopped to prevent heat generation at the actuator driving unit of the input/output module 13, to thereby restrain a temperature rise in the casing 23. Should the temperature rise continue, power supply to the less important control module 15 would be stopped to further prevent heat generation, thus preventing a rise in temperature.

Therefore, even in case of an abnormal temperature rise in the casing 23, less important functions excepting such important controls as fuel injection control, ignition control, and brake control, will be stopped in order to prevent temperature rise while the vehicle is kept on running, thereby improving the reliability of the motor vehicle.

It is to be understood that the present invention described above is not limited to the above-described embodiment, but various modifications and variations will be possible without departing from the spirit and scope of the present invention.

INDUSTRIAL APPLICABILITY

In the present invention, as described above, a plurality of control modules are present in one casing; therefore it is possible to distribute a signal inputted to the input/output module to each control module, thereby enabling preventing the use of duplicate input/output circuits. Also, particularly in the control equipment mounted on a motor vehicle, the GND potential often varies with a mounting place on the vehicle, and therefore it will become necessary to take a measure to input the signal through two lines including the signal line of the sensor together with the GND potential of the sensor as a set. According to the present invention, the vehicle control equipment is centralized to a unit, to make common the GND potential of each control module; thus it becomes possible to disuse the wiring harness for the GND potential from the sensor and to constitute the wiring only of the signal line for transmitting information.

What is claimed is:

1. A control module cluster unit adapted for use in a motor vehicle, comprising:
   a plurality of control modules having specialized control functions for controlling a plurality of equipment mounted on the motor vehicle;
   a mother board for connecting said control modules so that communication may occur between said control modules; and
   an input/output module connected to said mother board, for inputting data to, and outputting data from, at least one of said plurality of equipment to be controlled;
   said plurality of control modules, said mother board, and said input/output module being collectively mounted in one casing;
   a temperature detecting means for detecting temperature in said casing; and
   a function stop control means for stopping secondary functions in favor of primary functions within said cluster when the detected temperature in said casing exceeds a specific value; and
   a fail safe mechanism for preventing temperature rise within said casing.

2. A control module cluster unit as claimed in claim 1, in which a GND potential of each of said plurality of control modules has been commonized.

3. A control module cluster unit as claimed in claim 1, wherein said primary functions include at least one of fuel injection control, ignition control, and brake control.

4. A control module cluster unit as claimed in claim 1, wherein said fail safe mechanism includes a fan.

5. A method for controlling operation of a control module cluster unit for a motor vehicle, said control module cluster comprising a casing, a plurality of specialized control modules including a power source module, housed in said casing for controlling a plurality of equipment of said motor vehicle, a mother board for connecting said control modules, an input/output module connected to said mother board, and a temperature sensor disposed in said casing, said method comprising the steps of: *inputting first temperature data from said temperature sensor;*
   detecting a first temperature in said casing based on said first temperature data;
   determining if said first temperature is above a predetermined value;
   if said first temperature is above said predetermined value, stopping operation of a driving circuit of said input/output module driving at least one secondary function performed by at least one of said control modules in favor of primary functions performed by other of said control modules;
   inputting second temperature data from said temperature sensor;
   detecting a second temperature in said casing based on said second temperature data;
   determining a first temperature change between said first and second temperatures; and
   if said second temperature is greater than said first temperature, stopping said at least one of said control modules performing said at least one secondary function.

* * * * *

UNITED STATES PATENT AND TRADEMARK OFFICE
CERTIFICATE OF CORRECTION

PATENT NO.    :    5,414,416

DATED         :    May 9, 1995

INVENTOR(S)   :    YAMAKITA et al

It is certified that error appears in the above-identified patent and that said Letters Patent is hereby corrected as shown below:

On the title page item  "[30]  Foreign Application Priority Data

Sept. 3, 1901 [JP] . . ."

to

--[30] Foreign Application Priority Data

Sept. 3, 1991 [JP] . . .--

Signed and Sealed this

Eighth Day of August, 1995

Attest:

BRUCE LEHMAN

*Attesting Officer*    *Commissioner of Patents and Trademarks*